United States Patent
Poster et al.

(10) Patent No.: US 11,618,588 B2
(45) Date of Patent: Apr. 4, 2023

(54) DEPLOYABLE APPARATUS TO PREVENT HELICOPTER ROLLOVER

(71) Applicant: Bell Textron Inc., Fort Worth, TX (US)

(72) Inventors: Scott David Poster, Arlington, TX (US); Martin Peryea, Southlake, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 106 days.

(21) Appl. No.: 17/069,413

(22) Filed: Oct. 13, 2020

(65) Prior Publication Data
US 2021/0024226 A1 Jan. 28, 2021

Related U.S. Application Data

(62) Division of application No. 15/491,483, filed on Apr. 19, 2017, now Pat. No. 10,836,511.

(51) Int. Cl.
  *B64C 25/56* (2006.01)
  *B64C 27/06* (2006.01)
  *B64F 1/22* (2006.01)

(52) U.S. Cl.
  CPC .............. *B64F 1/221* (2013.01); *B64C 25/56* (2013.01); *B64C 27/06* (2013.01)

(58) Field of Classification Search
  CPC .......... B64C 35/001; B64C 37/00; B64C 5/12
  (Continued)

(56) References Cited

U.S. PATENT DOCUMENTS 2,151,004 A * 3/1939 Barclay ................. B64C 35/005
                                                  244/50
2,569,270 A * 9/1951 Wilson .................... B63B 41/00
                                                  114/133
(Continued)

FOREIGN PATENT DOCUMENTS

AT            501090 B1 *  1/2009    ......... A63B 69/0048
CA          2538477 A1     5/2006
(Continued)

OTHER PUBLICATIONS

European Patent Office, Communication pursuant to Article 94(3) EPC for EP Appl. No. 20169456.9 dated Feb. 24, 2021, 5 pp.
(Continued)

*Primary Examiner* — Christopher P Ellis
(74) *Attorney, Agent, or Firm* — Edwin S. Flores; Daniel J. Chalker; Chalker Flores, LLP

(57) ABSTRACT

The present invention includes an apparatus for preventing aircraft rollover upon a water landing comprising: a deployable first and/or second boom affixed by a first end to the aircraft and capable of deployment substantially perpendicular to a longitudinal axis of the aircraft; and a first and/or second air bladder attached to a second end of the first and/or second boom, wherein the first and/or second air bladders are configured to inflate when an aircraft lands in the water, wherein deployment of the first and second boom and air bladder prevents aircraft rollover upon water landing; or a deployable keel affixed by a first end to the aircraft and capable of deployment substantially perpendicular to a longitudinal axis and opposite a rotor of the aircraft upon a water landing, wherein the keel is sized to prevent aircraft rollover upon deployment; or both.

18 Claims, 11 Drawing Sheets

(58) Field of Classification Search
USPC .......................................................... 244/105
See application file for complete search history.

(56) References Cited

U.S. PATENT DOCUMENTS

| | | | | |
|---|---|---|---|---|
| 2,893,154 | A * | 7/1959 | McKee | A01M 31/06 |
| | | | | D22/125 |
| 2,958,306 | A * | 11/1960 | Haxton | B63B 1/125 |
| | | | | 441/130 |
| 3,004,737 | A | 10/1961 | Boyle et al. | |
| 3,154,270 | A | 10/1964 | Jensen | |
| 3,176,937 | A | 4/1965 | Labrecque et al. | |
| 3,301,343 | A * | 1/1967 | Hardy | B60V 1/06 |
| | | | | 180/116 |
| 3,507,466 | A | 4/1970 | La Fleur | |
| 3,776,171 | A * | 12/1973 | Sibthorpe | B63B 1/28 |
| | | | | 114/136 |
| 3,790,109 | A * | 2/1974 | Fischer | B64C 35/00 |
| | | | | 244/105 |
| 3,951,090 | A * | 4/1976 | Potter | F15B 1/02 |
| | | | | 114/132 |
| 4,376,416 | A * | 3/1983 | Carver | B63B 5/24 |
| | | | | 114/39.21 |
| 4,387,657 | A * | 6/1983 | Saunders | B63B 41/00 |
| | | | | 114/140 |
| 4,538,539 | A * | 9/1985 | Martin | B63B 41/00 |
| | | | | 114/144 R |
| 4,563,971 | A * | 1/1986 | Carver | B63B 41/00 |
| | | | | 114/132 |
| 4,655,415 | A | 4/1987 | Miller et al. | |
| 5,009,178 | A * | 4/1991 | Geffken | B63B 41/00 |
| | | | | 114/143 |
| 5,018,686 | A * | 5/1991 | Zimmer | B63B 1/30 |
| | | | | 114/274 |
| 5,765,778 | A | 6/1998 | Otsuka | |
| 5,860,381 | A * | 1/1999 | Fernandini | B63B 43/18 |
| | | | | 114/140 |
| 6,042,052 | A * | 3/2000 | Smith | B64C 35/007 |
| | | | | 244/101 |
| 6,499,420 | B1 * | 12/2002 | To | B64C 25/56 |
| | | | | 114/292 |
| 7,063,291 | B2 * | 6/2006 | Rado | B64C 3/42 |
| | | | | 244/101 |
| 7,115,010 | B2 | 10/2006 | Parrott et al. | |
| 8,342,446 | B2 * | 1/2013 | Chareyre | B64C 5/18 |
| | | | | 244/91 |
| 9,169,008 | B2 | 10/2015 | Bardy | |
| 9,469,398 | B2 | 10/2016 | Dijaux | |
| 9,533,757 | B2 | 1/2017 | Delorme et al. | |
| 2008/0302908 | A1 * | 12/2008 | Filipek | B63B 39/061 |
| | | | | 244/105 |
| 2011/0155840 | A1 * | 6/2011 | Lind, Jr. | B60F 3/00 |
| | | | | 244/17.11 |
| 2013/0299632 | A1 * | 11/2013 | Herzberger | B64C 25/10 |
| | | | | 244/102 R |
| 2014/0145030 | A1 | 5/2014 | Bardy | |
| 2014/0196653 | A1 * | 7/2014 | Leschevin | G01V 1/3808 |
| | | | | 114/253 |
| 2014/0252166 | A1 * | 9/2014 | Smith | B64C 25/56 |
| | | | | 244/107 |
| 2014/0319265 | A1 | 10/2014 | Cacciaguerra | |
| 2015/0102164 | A1 | 4/2015 | Helicopters | |
| 2015/0201979 | A1 * | 7/2015 | Paul | A61B 17/7233 |
| | | | | 606/62 |
| 2016/0128319 | A1 * | 5/2016 | Smart | A01M 31/06 |
| | | | | 43/2 |
| 2018/0305040 | A1 | 10/2018 | Poster et al. | |
| 2018/0354592 | A1 * | 12/2018 | Chaves | B63B 43/08 |
| 2019/0202570 | A1 * | 7/2019 | Smith | B64D 45/00 |
| 2022/0024584 | A1 * | 1/2022 | Peterson | B64C 25/54 |

FOREIGN PATENT DOCUMENTS

| | | | | |
|---|---|---|---|---|
| CA | 2972723 | A1 | 10/2018 | |
| CN | 113232832 | A * | 8/2021 | |
| CN | 113859530 | A * | 12/2021 | |
| DE | 2461847 | A1 * | 12/1974 | |
| DE | 10134778 | A1 * | 1/2003 | B63B 1/04 |
| EP | 2055628 | A2 * | 5/2009 | B63B 41/00 |
| EP | 0941919 | A1 * | 7/2013 | |
| EP | 3392142 | | 10/2018 | |
| EP | 3683133 | A1 * | 7/2020 | |
| EP | 3715246 | A1 | 9/2020 | |
| EP | 3793085 | A1 * | 3/2021 | H02S 20/00 |
| FR | 2768695 | A1 * | 3/1999 | B63B 41/00 |
| GB | 1592501 | A * | 7/1981 | B63B 39/06 |
| GB | 2362356 | A * | 11/2001 | B63B 41/00 |
| GB | 2423971 | A * | 9/2006 | B60V 1/04 |
| GB | 2440320 | A * | 1/2008 | B64C 25/54 |
| GB | 2459984 | A * | 11/2009 | B63B 41/00 |
| RU | 2520812 | C1 * | 6/2014 | |
| WO | WO-8100664 | A1 * | 5/1999 | |
| WO | WO-2008089511 | A1 * | 7/2008 | B64C 25/10 |
| WO | WO-2010098726 | A2 * | 9/2010 | B63B 3/38 |
| WO | 2010133971 | A2 | 11/2010 | |
| WO | WO-2012054152 | A1 * | 4/2012 | F03B 13/182 |
| WO | WO-2012107237 | A2 * | 8/2012 | B63B 3/38 |
| WO | WO-2013131122 | A1 * | 9/2013 | B63G 13/00 |
| WO | WO-2015035493 | A1 * | 3/2015 | B64C 25/04 |
| WO | WO-2015038009 | A1 * | 3/2015 | B63B 1/10 |
| WO | WO-2020151906 | A1 * | 7/2020 | B63B 43/16 |
| WO | WO-2021170481 | A1 * | 9/2021 | |

OTHER PUBLICATIONS

Canadian Intellectual Property Office, Examination Report for Canadian Patent Appl. No. 2,972,723 dated Jul. 13, 2018, 4 pp.
Canadian Intellectual Property Office, Examination Report for Canadian Patent Appl. No. 2,972,723 dated Jan. 18, 2019, 4 pp.
Canadian Intellectual Property Office, Examination Report for Canadian Patent Appl. No. 2,972,723 dated Nov. 7, 2019, 4 pp.
European Patent Office, Invitation Pursuant to Rule 62a(1) for EP Appl. No. 17182786.8 dated Mar. 16, 2018, 2 pp.
European Patent Office, European Search Report for EP Appl. No. 17182786.8 dated May 30, 2018, 4 pp.
European Patent Office, Communication pursuant to Article 94(3) EPC for EP Appl. No. 17182786.8 dated Jun. 15, 2018, 7 pp.
European Patent Office, Communication pursuant to Article 94(3) EPC for EP Appl. No. 17182786.8 dated Dec. 10, 2018, 7 pp.
European Patent Office, Communication pursuant to Article 94(3) EPC for EP Appl. No. 17182786.8 dated May 17, 2019, 5 pp.
European Patent Office, Communication pursuant to Article 94(3) EPC for EP Appl. No. 20169456.9 dated Jul. 22, 2020, 6 pp.

* cited by examiner

DEPLOYABLE APPARATUS TO PREVENT HELICOPTER ROLLOVER

CROSS-REFERENCE TO RELATED APPLICATIONS

This application claims priority to and is a divisional patent application of U.S. patent application Ser. No. 15/491,483 filed on Apr. 19, 2017, which is hereby incorporated by reference in its entirety.

STATEMENT OF FEDERALLY FUNDED RESEARCH

Not applicable.

TECHNICAL FIELD OF THE INVENTION

The present invention relates in general to the field of aircraft rollover, and more particularly, to a deployable apparatus to prevent helicopter rollover upon a water landing.

BACKGROUND OF THE INVENTION

Without limiting the scope of the invention, its background is described in connection with aircraft water landings.

One such example is taught in U.S. Pat. No. 7,115,010, issued to Parrott, et al., entitled "Floatation system including life raft". Briefly, a floatation system is disclosed for attachment to a helicopter landing skid that includes a girt dimensioned to be attached to a landing skid and a plurality of floats attached to the elongate girt, wherein the plurality of floats are adapted to be converted from a packed configuration to an deployed configuration, and wherein at least one of the plurality of floats extends beneath the elongate girt when the plurality of floats is in the deployed configuration.

Another example is taught in U.S. Pat. No. 5,765,778, issued to Otsuka and entitled, "Flight vehicle with a safety device". Briefly, this inventor teaches an aircraft that is capable of safely landing during an emergency landing is disclosed. The aircraft has a safety device that includes a plurality of auxiliary engines, wherein each auxiliary engine is movable so as to vary the thrust axis in a range between a substantially horizontal direction and a substantially vertical direction. The safety device is said to also include a plurality of gas bags contracted and disposed at a lower portion of the aircraft body so as to be instantly expandable at a necessary time, such as during an emergency landing.

SUMMARY OF THE INVENTION

In one embodiment, the present invention includes an apparatus for preventing aircraft rollover upon a water landing comprising: a deployable first boom affixed by a first end to the aircraft and capable of deployment substantially perpendicular to a longitudinal axis of the aircraft; and a first air bladder attached to a second end of the first boom, wherein the first air bladder is configured to inflate when an aircraft lands in the water, wherein deployment of the first boom and first air bladder prevents aircraft rollover upon water landing. In one aspect, a first weight is also attached to the second end of the first boom. In another aspect, the apparatus further comprises a second deployable boom attached by a first end of the second boom to the aircraft and a second air bladder is attached to the second end of the second boom, wherein the second boom with the second deployable air bladder deploy upon a water landing. In another aspect, the apparatus further comprises a second boom attached by a first end of the second boom to the aircraft and that deploys substantially perpendicular to the longitudinal axis of the aircraft opposite the first boom, and a second air bladder and a second weight are attached to the second end of the second boom, wherein the second deployable air bladder and second weight deploys upon a water landing. In another aspect, one or more load attenuators are used to connect the first of the second air bladder to the boom, and wherein the one or more load attenuators comprise at least one of a "T" configuration, a "Z" configuration, a variable density of stiches, a fold and a plurality of stitches in the fold, a plurality of thread types, a tear-fabric, or a woven fabric. In another aspect, the apparatus further comprises one or more additional air bladders that deploy from the body of the aircraft, from a landing gear, or from a skid attached to the aircraft. In another aspect, at least one of the first or the second booms are defined further as sponsons that deploy perpendicular to the longitudinal axis of the aircraft. In another aspect, the apparatus further comprises at least one of a deployable sail, a parachute or a weight or sea anchor that deploys from the tail boom upon water landing to provide a weathercock. In another aspect, the apparatus further comprises a deployable keel affixed by a first end to the aircraft and capable of deployment substantially perpendicular to a longitudinal axis and opposite a rotor of the aircraft upon a water landing, wherein the keel is sized to prevent aircraft rollover upon deployment.

In another embodiment, the present invention includes an apparatus for preventing aircraft rollover upon water landing comprising: a deployable keel affixed by a first end to the aircraft and capable of deployment substantially perpendicular to a longitudinal axis and opposite a rotor of the aircraft upon a water landing, wherein the keel is sized to prevent aircraft rollover upon deployment. In one aspect, the keel is affixed at either a front of the aircraft and fans out from back from front of the aircraft, of the keel is affixed to the rear of the aircraft and deploys from front to back. In another aspect, the keel is defined further as comprising a support and fabric, wherein the fabric deploys between the support and the aircraft. In another aspect, the keel is defined further as comprising weight at the end opposite the attachment of the keel to the aircraft. In another aspect, the apparatus further comprises at least one of a deployable sail, a parachute, sea anchor, or a weight that deploys from the tail rotor upon water landing to provide a weathercock. In another aspect, the apparatus further comprises a first, a second, or both a first and second deployable boom, each of the first boom, the second boom, or both being attached by a first end to the aircraft; and a first air bladder attached to a second end of the first boom; a second air bladder attached to the second end of the second boom, or both; wherein the first, the second, or both the first and second booms and the first, the second, or both, the first and second deployable air bladders, are deploy upon a water landing. In another aspect, the apparatus further comprises a first weight attached to a second end of the first boom, a second weight attached to a second end of the second boom, or both a first and a second weight attached to the first and second boom, respectively, wherein the first, the second, or both the first and second weights are deployed upon a water landing.

In another embodiment, the present invention includes an aircraft comprising: a plurality of air bladders that deploy around the aircraft upon a water landing; a first deployable boom affixed by a first end to the aircraft and capable of deployment substantially perpendicular to a longitudinal axis of the aircraft upon a water landing; and a first deployable air bladder attached to a second end of the boom, wherein the first deployable air bladder is configured to inflate when an aircraft lands in the water and prevent rollover of the aircraft, wherein deployment of the boom and first deployable air bladder prevents aircraft rollover upon water landing. In one aspect, a weight or sea anchor is also attached to the second end of the first boom. In another aspect, the apparatus further comprises a second boom attached by a first end of the second boom to the aircraft and that deploys substantially perpendicular to the longitudinal axis of the aircraft and opposite the first air bladder upon a water landing. In another aspect, the apparatus further comprises a second boom attached by a first end of the second boom to the aircraft and that deploys substantially perpendicular to the longitudinal axis of the aircraft opposite the first boom, and a second air bladder is attached to the second end of the second boom, wherein the second air bladder deploys upon a water landing. In another aspect, the apparatus further comprises a second boom attached by a first end of the second boom to the aircraft and that deploys substantially perpendicular to the longitudinal axis of the aircraft opposite the first boom, and a second air bladder and a sea anchor or weight are attached to the second end of the second boom, wherein the second air bladder deploys upon a water landing. In another aspect, the one or more load attenuators are used to connect the first of the second air bladder to the boom, and wherein the one or more load attenuators comprise at least one of a "T" configuration, a "Z" configuration, a variable density of stiches, a fold and a plurality of stitches in the fold, a plurality of thread types, a tear-fabric, or a woven fabric. In another aspect, at least one of the first or the second booms are defined further as sponsons that deploy perpendicular to the longitudinal axis of the aircraft. In another aspect, the apparatus further comprises at least one of a deployable sail, a parachute, sea anchor, or a weight that deploys from the tail rotor upon water landing to provide a weathercock.

In another embodiment, the present invention includes an aircraft comprising: a plurality of flotation air bladders that deploy around the aircraft upon a water landing; and a deployable keel affixed by a first end to the aircraft and capable of deployment substantially perpendicular to a longitudinal axis and opposite a rotor of the aircraft upon a water landing, wherein the keel is sized to prevent aircraft rollover.

In another embodiment, the present invention includes a method of preventing aircraft rollover comprising: selecting a sea state and an aircraft, wherein the aircraft comprises an airframe fitting; sizing at least a first boom affixed by a first end to the aircraft and capable of deployment substantially perpendicular to a longitudinal axis of the aircraft upon a water landing; and selecting a first air bladder attached to a second end of the boom, wherein the first air bladder is configured to inflate when an aircraft lands in the water and prevents rollover of the aircraft, wherein deployment of the boom and first air bladder prevents aircraft rollover upon water landing. In another aspect, the method further comprises adding a sea anchor or weight is also attached to the second end of the first boom. In another aspect, the method further comprises adding a second boom attached by a first end of the second boom to the aircraft and that deploys substantially perpendicular to the longitudinal axis of the aircraft and opposite the first air bladder upon a water landing. In another aspect, the method further comprises adding a second boom attached by a first end of the second boom to the aircraft and that deploys substantially perpendicular to the longitudinal axis of the aircraft opposite the first boom, and a second air bladder is attached to the second end of the second boom, wherein the second airbladder deploys upon a water landing. In another aspect, the method further comprises adding a second boom attached by a first end of the second boom to the aircraft and that deploys substantially perpendicular to the longitudinal axis of the aircraft opposite the first boom, and a second air bladder and a weight are attached to the second end of the second boom, wherein the second air bladder deploys upon a water landing. In another aspect, the method further comprises adding one or more additional air bladders that deploy from the body of the aircraft, from a landing gear, or from a skid attached to the aircraft. In another aspect, at least one of the first or the second booms are defined further as sponsons that deploy perpendicular to the longitudinal axis of the aircraft. In another aspect, the method further comprises adding at least one of a deployable sail, a parachute, sea anchor, or a weight that deploys from the tail rotor upon water landing to provide a weathercock.

In another embodiment, the present invention includes a method of preventing aircraft rollover comprising: selecting a sea state and an aircraft, wherein the aircraft comprises an airframe fitting; sizing a deployable keel affixed by a first end to the aircraft and capable of deployment substantially perpendicular to a longitudinal axis and opposite a rotor of the aircraft upon a water landing, wherein the keel is sized to prevent aircraft rollover upon deployment. In another aspect, the method further comprises sizing a first, a second, or both a first and second deployable boom, each of the first boom, the second boom, or both being attached by a first end to the aircraft; and a first air bladder attached to a second end of the first boom; a second air bladder attached to the second end of the second boom, or both; wherein the first, the second, or both the first and second booms and the first, the second, or both, the first and second deployable air bladders, are deploy upon a water landing.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This invention augments existing float kits designed for various helicopters. These float kits prevent the total loss of the aircraft after a water landing, but do not always prevent the aircraft from inverting after landing.

The deployable apparatus of the present invention would be added to the existing float kit of an aircraft. The deployable apparatus may include several features depending on application. One feature includes a long boom with a single float, the addition of a sea anchor for stabilization, a second boom on the opposite side, or combinations thereof. Another iteration of a deployable feature includes a keel or other object that deploys down into the water to resist the overturning moment, and/or a feature that orients it into the wind and waves. One or more of these deployable features can be included as a kit to attach to existing aircraft or built into a new aircraft.

Figure 1:
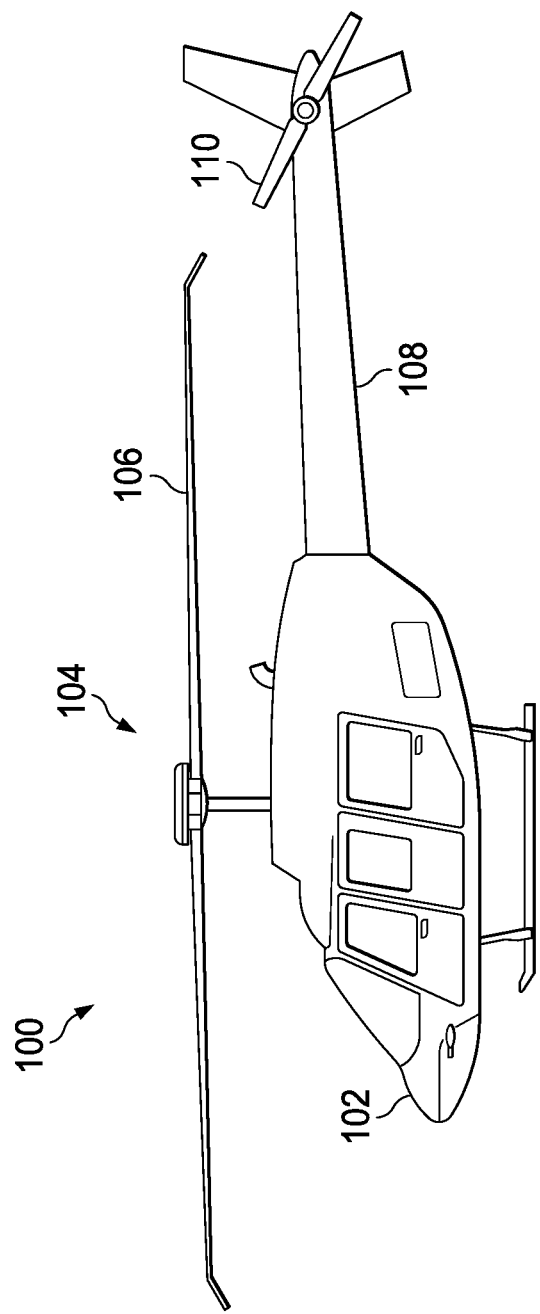
FIG. 1 shows a side view of an aircraft, specifically, a helicopter, for use of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with rotor system 104 for creating flight. The system of the present invention can be used in conjunction with an aircraft 100. Although shown associated with a helicopter, it will be appreciated that the system of the present application could also be utilized with different types of rotary aircraft and vehicles whether they have one or more rotors. The tail rotor 110 is connected to the fuselage by tail boom 108.

Figure 2:
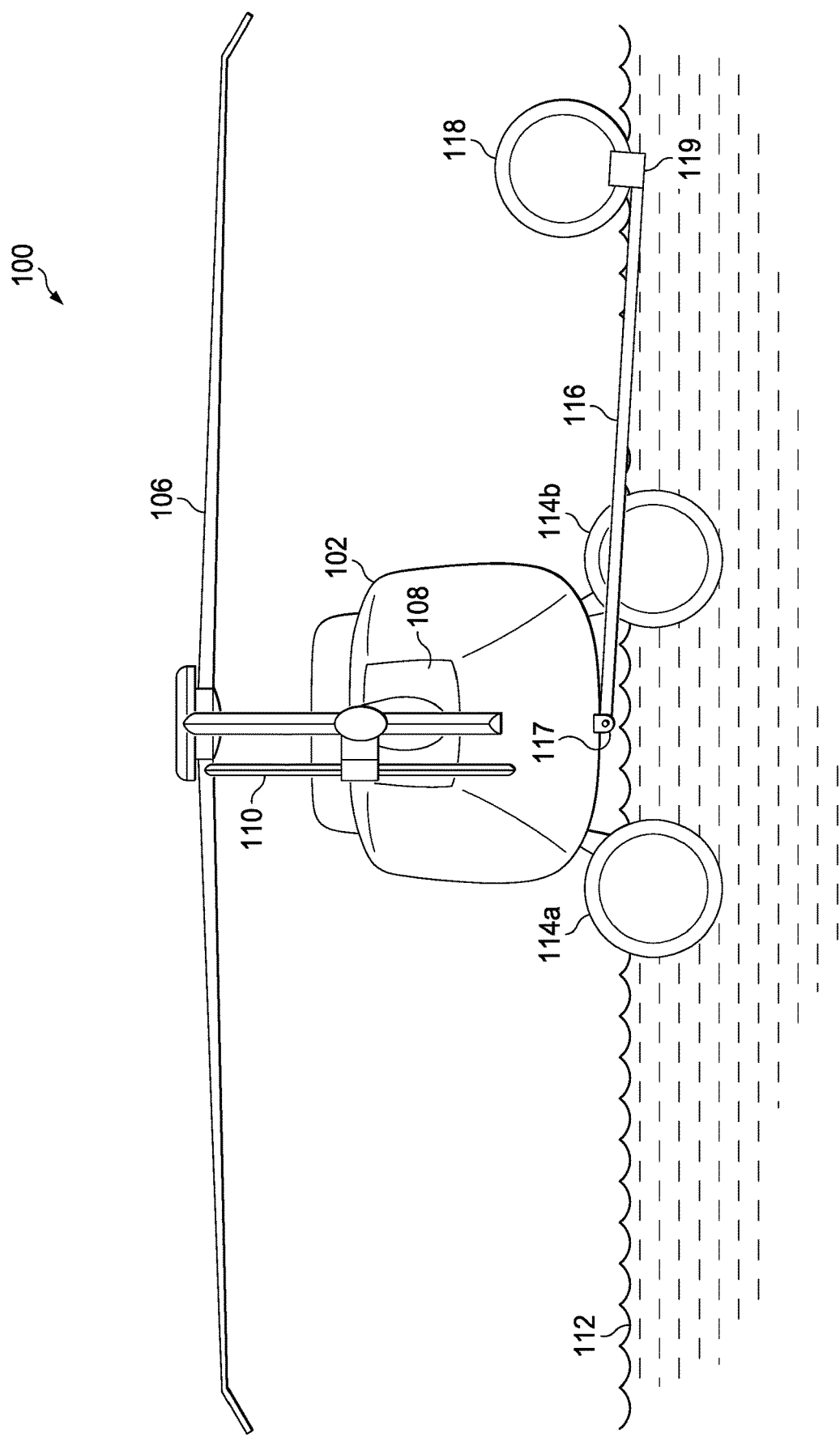
FIG. 2 shows a rear view of an aircraft in which the helicopter has floats and a deployable boom deploys with a float to resist overturning moment.

FIG. 2 shows a rear view of an aircraft 100, shown as a helicopter 100, shown in the context of the fuselage 102, the tail rotor 110, and blades 106, and is floating on water 112 using float kits 114a and 114b, adjacent or about the fuselage 102. A first deployable boom 116 is connected to the fuselage 102 at first end 117, and is shown deployed, with the first air bladder 118 connected to second end 119 of the first deployable boom 116. The length of the first deployable boom 116, the size of the first air bladder 118, or both, are sized to at least partially float and to resist the overturning moment of the aircraft 100 when in the water 112. While the second end 119 is depicted as being below the waterline of water 112, the skilled artisan will recognize that it would also attach above the first air bladder 118. Likewise, the first end 117 of the first deployable boom 116 is depicted as being close to the waterline of water 112, but the skilled artisan will recognize that the first deployable boom 116 can attach to the fuselage 102 of the aircraft 100, it can attach at or about the tail boom 108.

Figure 3:
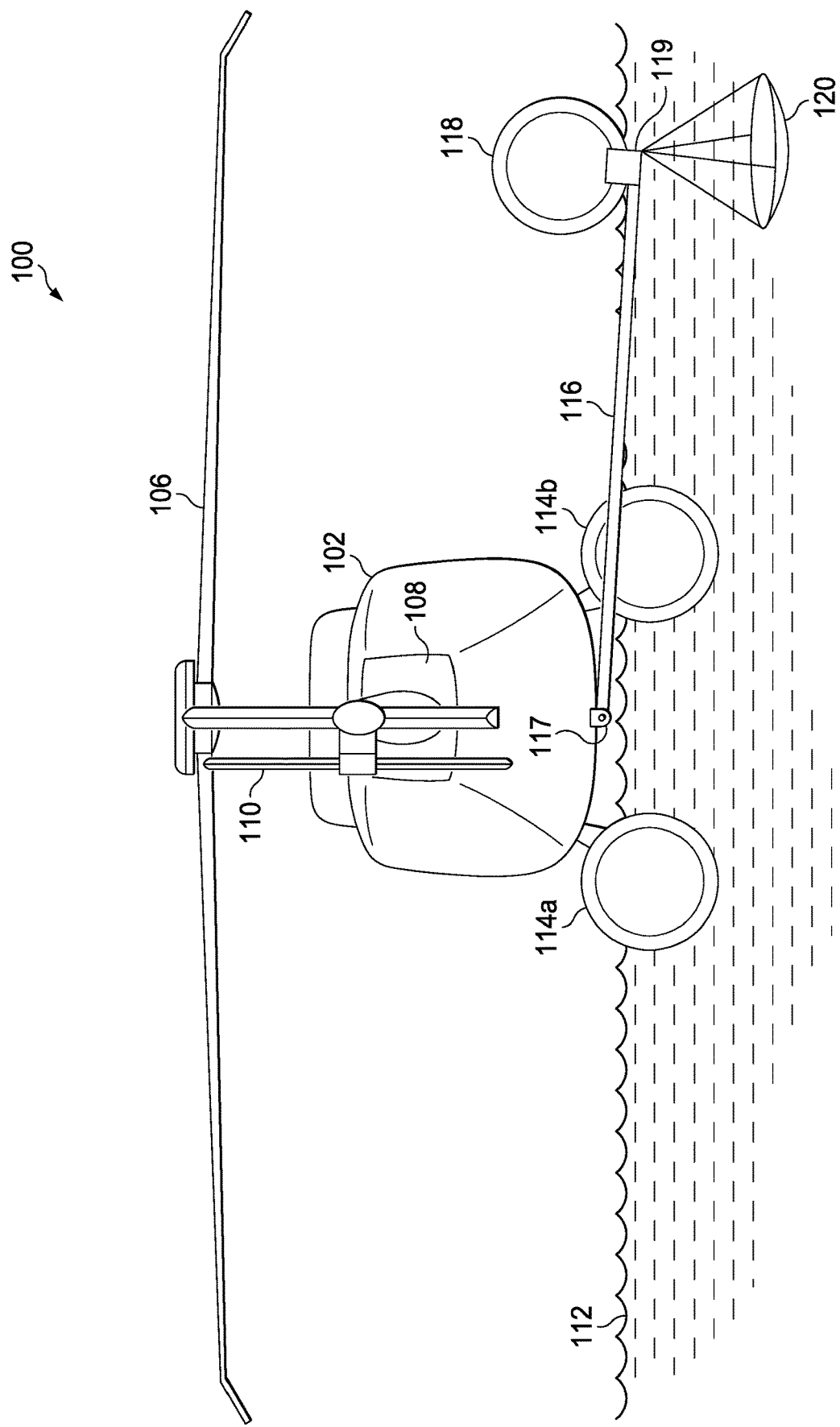
FIG. 3 shows a rear view of an aircraft in which the helicopter has floats, a deployable boom, and sea anchor that deploys with floats to resist overturning moment.

FIG. 3 shows a rear view of an aircraft 100, shown as a helicopter 100, shown in the context of the fuselage 102, tail boom 108, tail rotor 110, and blades 106, and is floating on water 112 using float kits 114a and 114b, adjacent or about the fuselage 102. A first deployable boom 116 is connected to the fuselage 102 at first end 117, and is shown deployed, with the first air bladder 118 connected to second end 119 of the first deployable boom 116, and also a weight or sea anchor 120. The length of the first deployable boom 116, the size of the first air bladder 118, and/or the weight or sea anchor 120, are sized to at least partially float and sink and to resist the overturning moment of the aircraft 100 when in the water 112.

Figure 4:
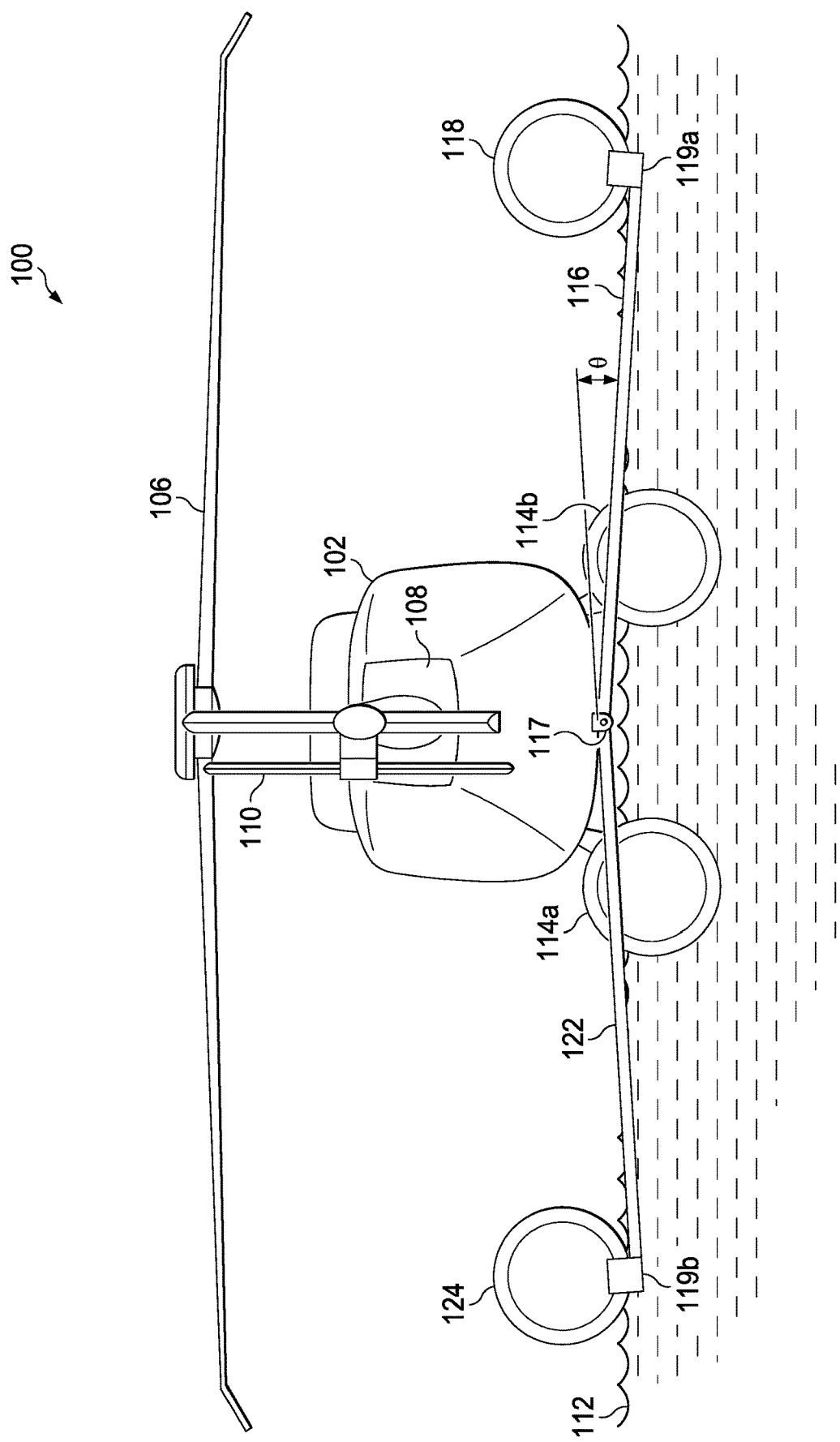
FIG. 4 shows a rear view of an aircraft in which the helicopter has floats and dual deployable booms that deploy with floats to resist overturning moment.

FIG. 4 shows a rear view of an aircraft 100, shown as a helicopter 100, shown in the context of the fuselage 102, tail boom 108, tail rotor 110, and blades 106, and is floating on water 112 using float kits 114a and 114b, adjacent or about the fuselage 102. A first deployable boom 116 is connected to the fuselage 102 at first end 117, and is shown deployed, with the first air bladder 118 connected to second end 119a of the first deployable boom 116. A second deployable boom 122 is connected to the fuselage 102, and is shown deployed, with the second air bladder 124 connected the second deployable boom 122, opposite the first deployable boom 116, and also connected at about first end 117. The length of the first and second deployable booms 116, 122, and the size of the first and second air bladders 118, 124, or both, are sized to at least partially float and to resist the overturning moment of the aircraft 100 when in the water 112. In this configuration, the first and second deployable booms 116, 122 are depicted at an angle θ from the longitudinal axis of the aircraft 100, however, the skilled artisan will recognize that another angle can vary, namely, the angle between the longitudinal axis (or centerline) of the aircraft 100 and the final position of the first and second deployable booms 116, 122 when viewed from the top. Generally, the first and second deployable booms 116, 122 can be perpendicular to the longitudinal axis (or centerline) of the aircraft 100, but the angle can also be more or less, depending on the configuration selected. While the second end 119a, 119b is depicted as being below the waterline of water 112, the skilled artisan will recognize that it would also attach above the first air bladder 118. Likewise, the first end 117 of the first deployable boom 116 is depicted as being close to the waterline of water 112, but the skilled artisan will recognize that the first deployable boom 116 can attach to the fuselage 102 of the aircraft 100, it can attach at or about the tail boom 108.

Figure 5:
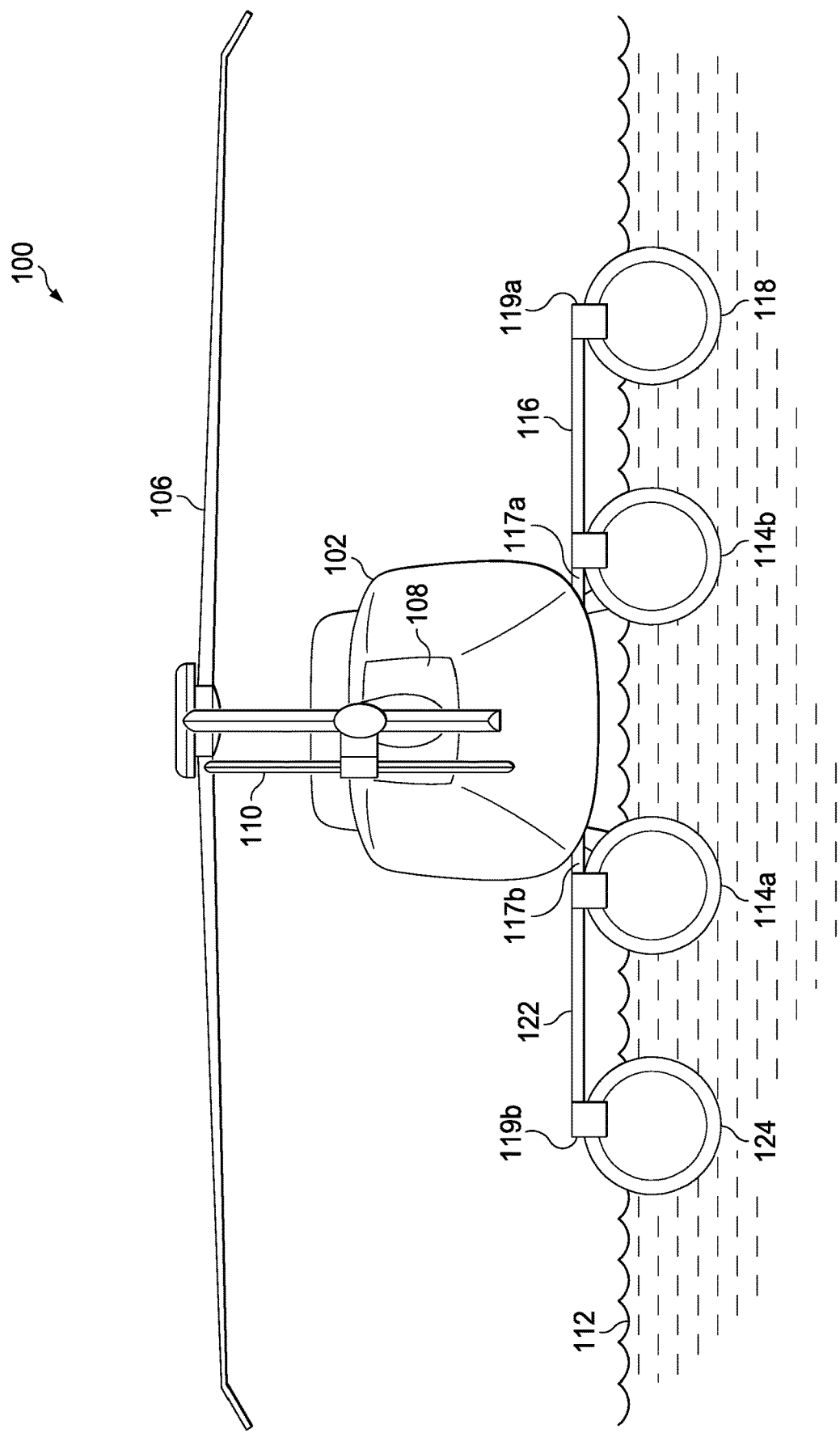
FIG. 5 shows a rear view of an aircraft in which the helicopter has floats on sponsons that deploy outboard to resist overturning moment.

FIG. 5 shows a rear view of an aircraft 100, shown as a helicopter 100, shown in the context of the fuselage 102, tail boom 108, tail rotor 110, and blades 106, and is floating on water 112 using float kits 114a and 114b, adjacent or about the fuselage 102. A first deployable boom 116 is connected to the fuselage 102 at first end 117a, and is shown deployed, with the first air bladder 118 connected to second end 119a of the first deployable boom 116 in the form of a deployable sponson. A second deployable boom 122 is connected to the fuselage 102 at first end 117b, and is shown deployed, with the second air bladder 124 connected the second deployable boom 122 at the second end 119b, opposite the first deployable boom 116, also in the form of the deployable sponson. In this configuration, the two float kits 114a and 114b can be either optional, or can become the first and second deployable booms 116, 122. In this embodiment, the sponsons are shown above the waterline, however, the ends 119a, 119b could also be angled and be above, at, or below the waterline.

Figure 6:
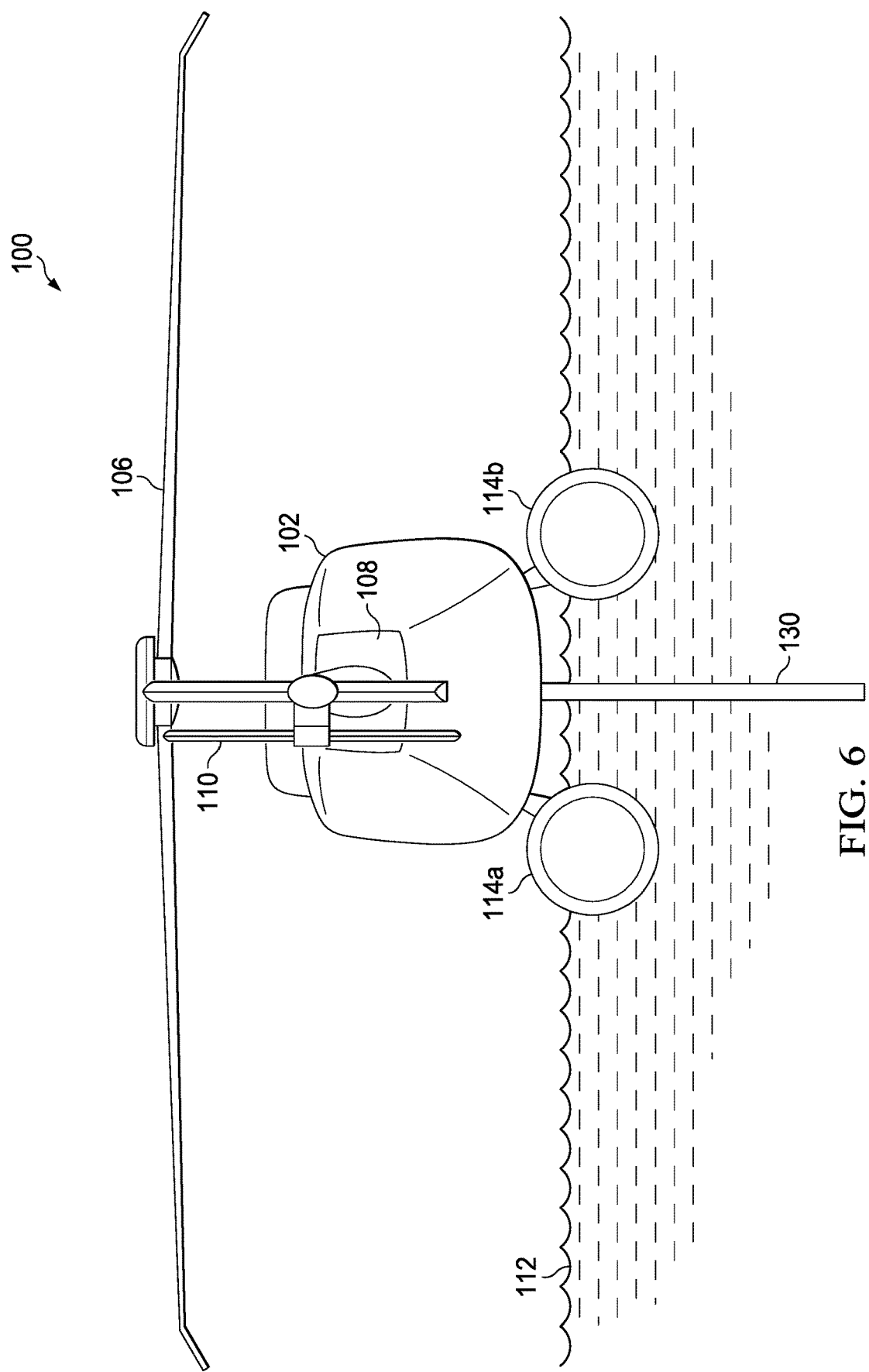
FIG. 6 shows a rear view of an aircraft in which the helicopter has floats and keel with a surface area that deploys with floats to resist overturning moment.

FIG. 6 shows a rear view of an aircraft 100, shown as a helicopter 100, shown in the context of the fuselage 102, tail boom 108, tail rotor 110, and blades 106, and is floating on water 112 using float kits 114a and 114b, adjacent or about the fuselage 102. In this configuration, a keel 130 is depicted in the deployed position and serves to resist the overturning moment by preventing fuselage rotation of the aircraft 100, by providing extra weight, or both.

Figure 7:
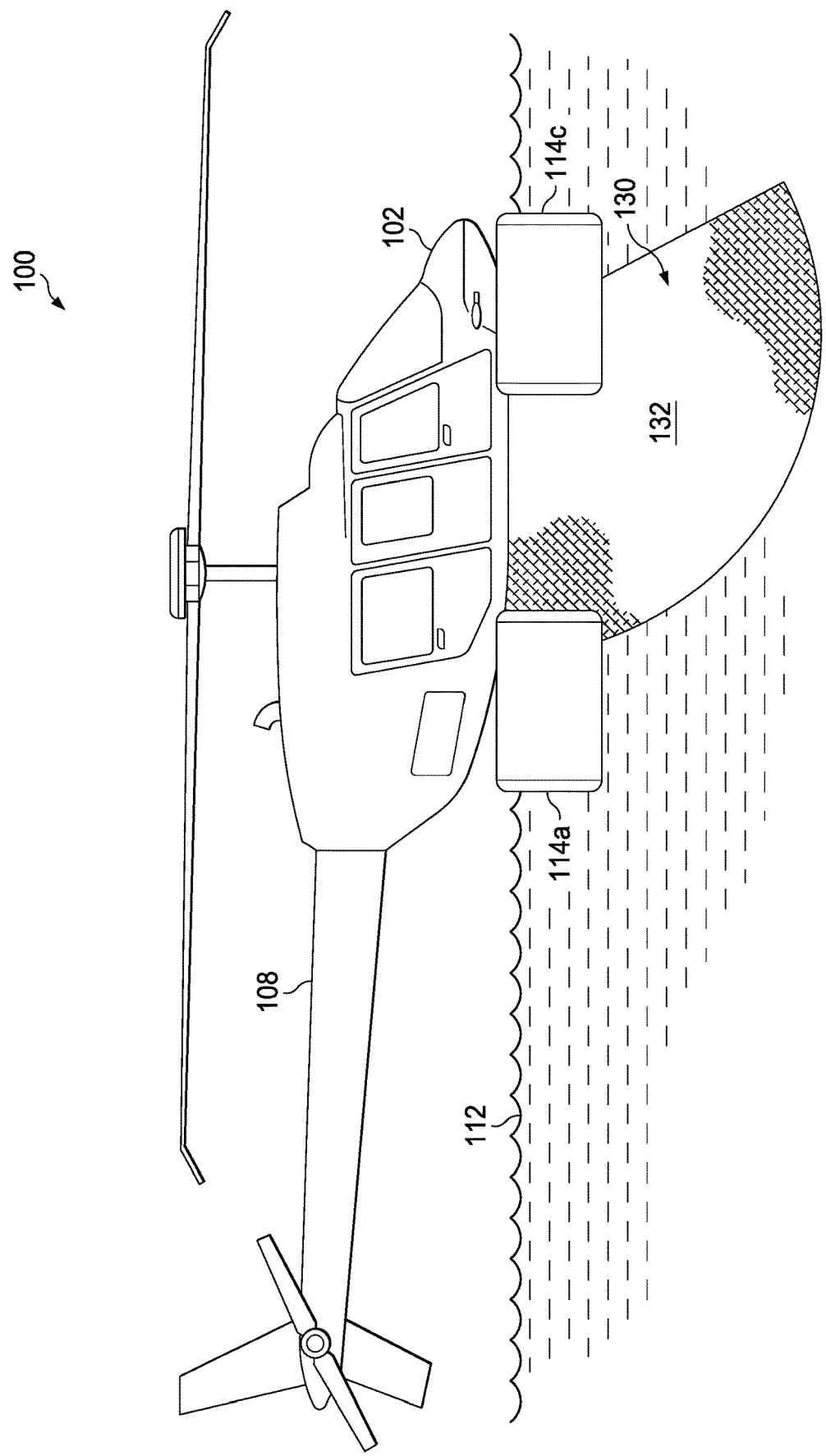
FIG. 7 shows a side view of an aircraft in which the helicopter has floats and a deployable apparatus or fan type object to resist overturning moment.

FIG. 7 shows a side view of an aircraft 100, shown as a helicopter 100, shown in the context of the fuselage 102, tail boom 108, tail rotor 110, and is floating on water 112 using float kit 114a and a forward float kit 114c, adjacent or about the fuselage 102. In this configuration, a keel 130 is depicted in the deployed position and serves to resist the overturning moment by preventing fuselage rotation of the aircraft 100, by providing extra weight, or both. In this configuration, the keel deploys from the back to the front of the aircraft 100 and may include a fan 132, which can be, e.g., fabric, polymer, or other generally lightweight but strong material.

Figure 8:
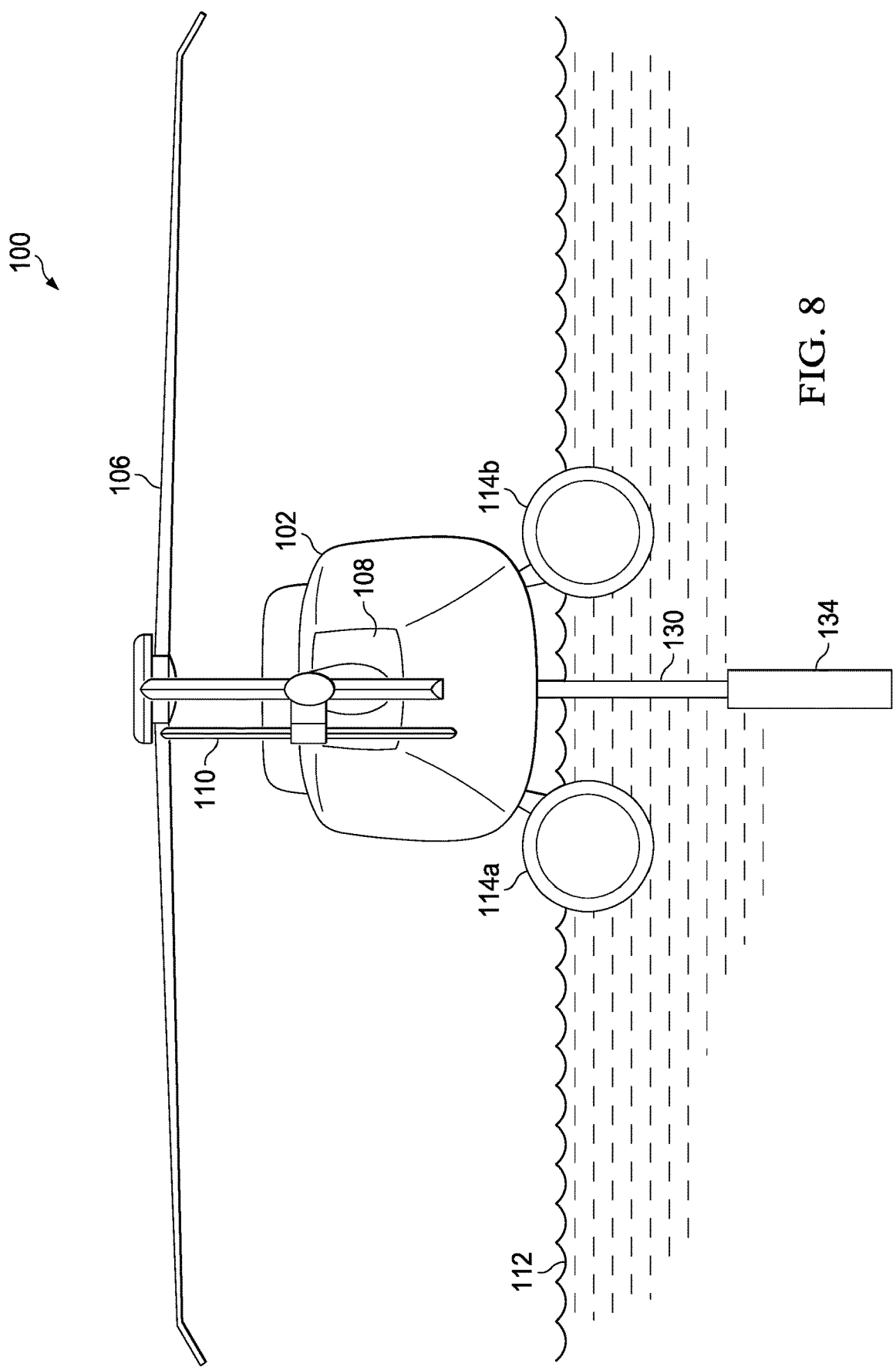
FIG. 8 shows a rear view of an aircraft in which the helicopter has floats, and a mass that deploys with floats to resist overturning moment.

FIG. 8 shows a rear view of an aircraft 100, shown as a helicopter 100, shown in the context of the fuselage 102, tail boom 108, tail rotor 110, and blades 106, and is floating on water 112 using float kits 114a and 114b, adjacent or about the fuselage 102. In this configuration, a keel beam, or cable 130 is depicted in the deployed position and serves to resist the overturning moment by preventing fuselage rotation of the aircraft 100, by providing a weight 134, which would be sized and provide sufficient weight to resist the overturning moment of the aircraft 100 in water 112, but would not overwhelm the air bags from float kits 114a and 114b.

Figure 9:
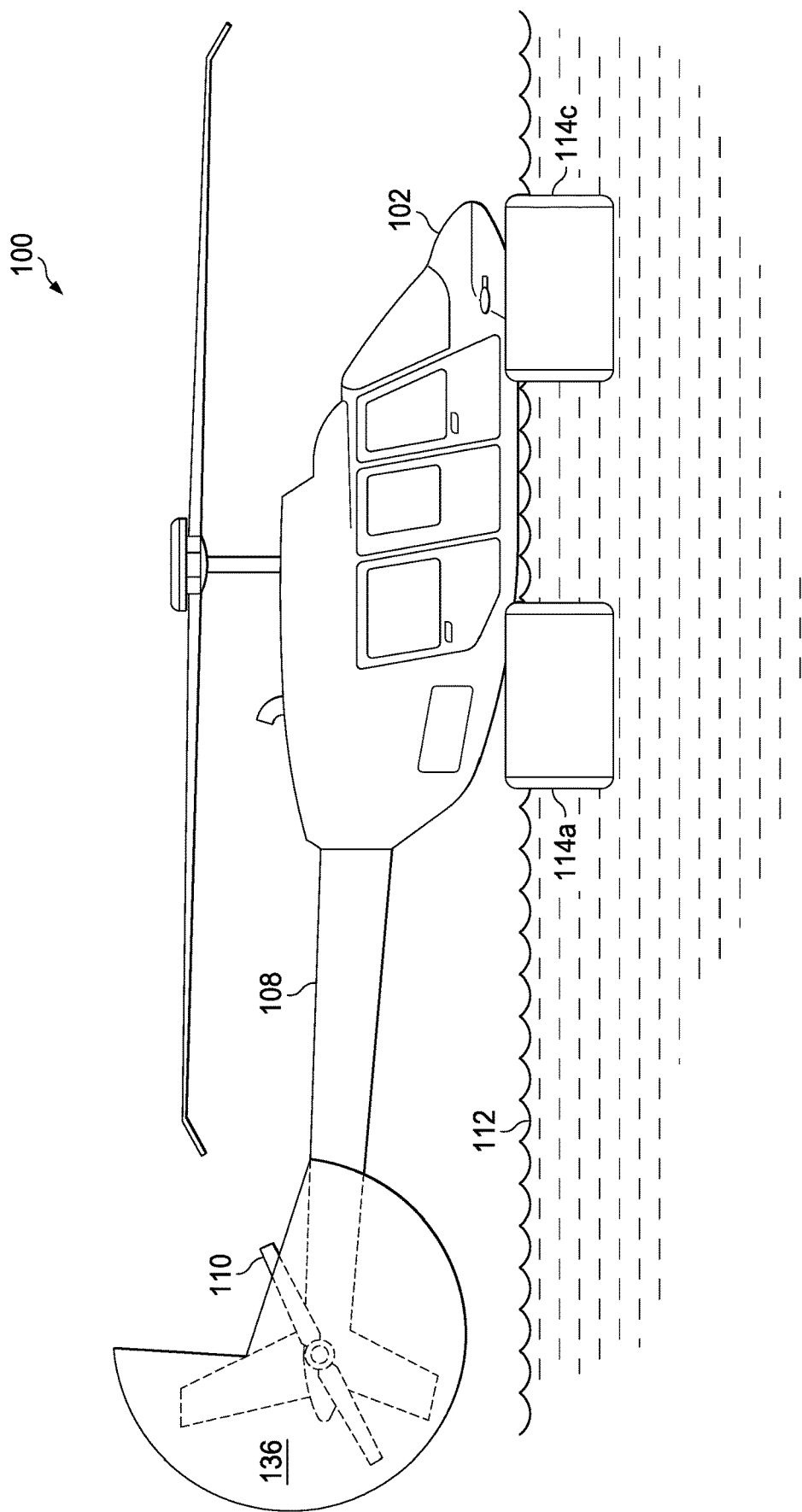
FIG. 9 shows a side view of an aircraft in which the helicopter has floats and a deployable apparatus to encourage the aircraft to weathercock into the wind/waves.

FIG. 9 shows a side view of an aircraft 100, shown as a helicopter 100, shown in the context of the fuselage 102, tail boom 108, and tail rotor 110, and is floating on water 112 using float kit 114a and a forward float kit 114c, adjacent or about the fuselage 102. In this configuration, a sail 136 deploys from the tail rotor 110, to weathercock the aircraft 100 into the wind/waves.

Figure 10:
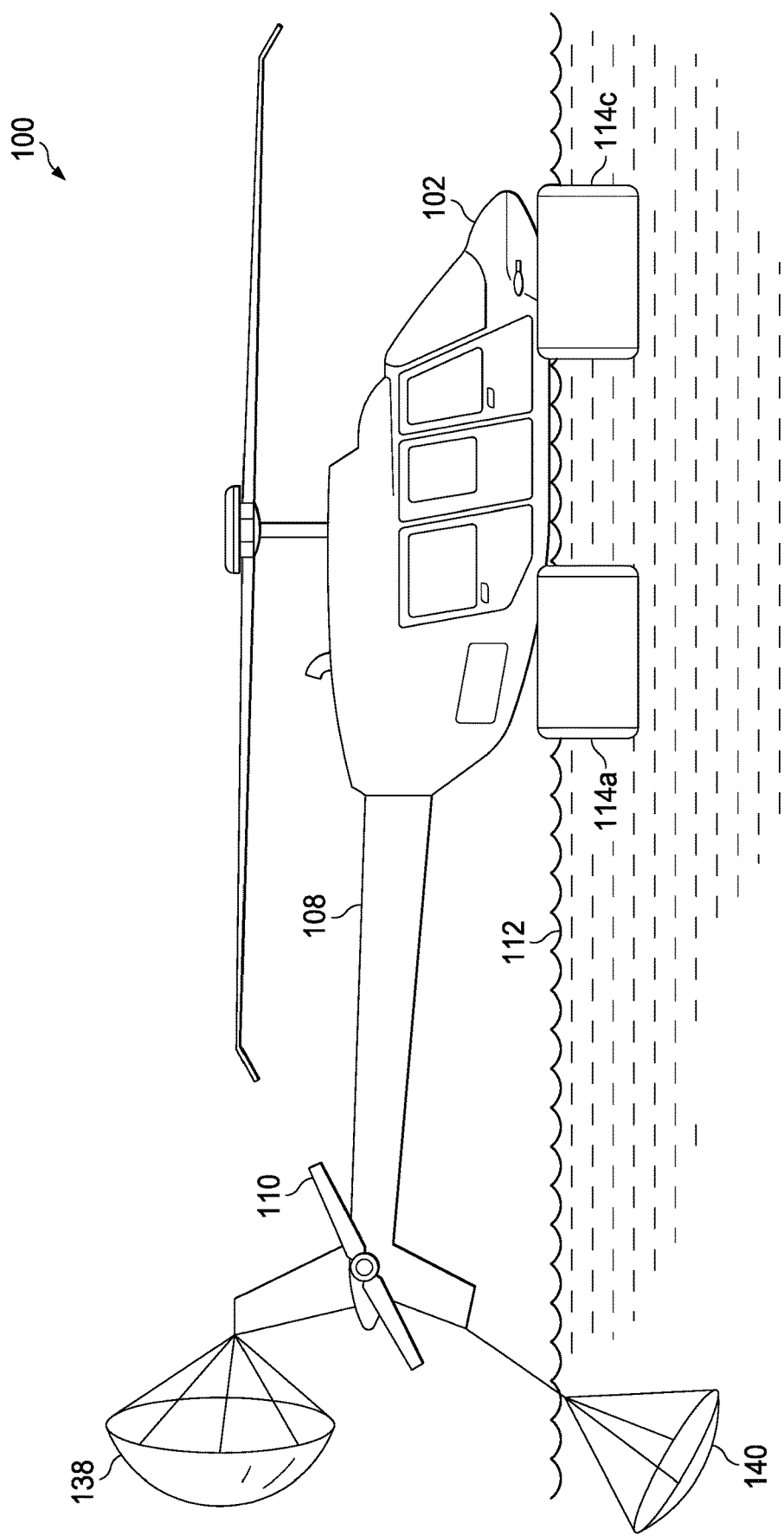
FIG. 10 shows a side view of an aircraft in which the helicopter has floats and deployable apparatus to encourage the aircraft to weathercock into or away from the wind/waves.

FIG. 10 shows a side view of an aircraft 100, shown as a helicopter 100, shown in the context of the fuselage 102, tail boom 108, tail rotor 110, and is floating on water 112 using a float kit 114a and a forward float kit 114c, adjacent or about the fuselage 102. In this configuration, a parachute 138 deploys from the tail rotor 110 and a sea anchor or weight 140, which may or may not be below the surface of the water 112. The parachute 138 and/or sea anchor or weight 140 help weathercock the aircraft 100 into the wind/waves. Instead of the parachute 138, the weathercocking can be the results of a combination of a sail 136 (not shown) and sea anchor or weight 140, or just the sea anchor or weight 140.

Figure 11:
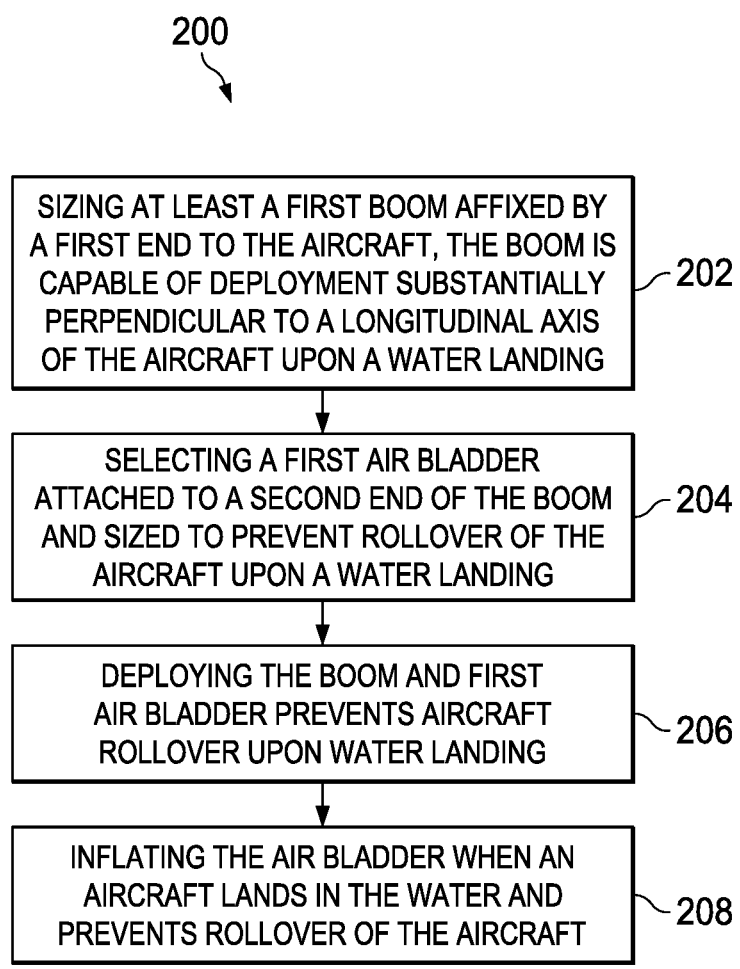
FIG. 11 shows a flowchart of the method of the present invention.

FIG. 11 is a flowchart 200 that shows the basic steps of the present invention. In first step 202, a first boom is sized for deployment and to prevent rollover of an aircraft that contacts water, wherein the first boom is affixed by a first end to the aircraft and the first boom is capable of deployment substantially perpendicular to a longitudinal axis of the aircraft upon a water landing. In step 204, the size of a first air bladder is selected to prevent roll-over of the aircraft upon water landing, wherein the first air bladder is attached to a second end of the first boom. In step 206, upon water landing, deploying the boom and first air bladder prevents aircraft rollover. Finally, in step 208, the air bladder is inflated when an aircraft lands in the water and prevents rollover of the aircraft.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. An apparatus for preventing aircraft rollover upon a water landing of an aircraft that is supported by a plurality of float kits of the aircraft, the apparatus comprising:
a deployable keel affixed by a first end to the aircraft and capable of deployment substantially perpendicular to a longitudinal axis and opposite a rotor of the aircraft upon a water landing, wherein the keel is sized to prevent aircraft rollover upon deployment, and wherein the keel is defined further as comprising a support and fabric, wherein the fabric deploys between the support and the aircraft.

2. The apparatus of claim 1, wherein the keel is affixed at either a front of the aircraft and fans out from back to front of the aircraft, or the keel is affixed to a rear of the aircraft and deploys from front to back.

3. The apparatus of claim 1, wherein the keel is defined further as comprising weight at the end opposite the attachment of the keel to the aircraft.

4. The apparatus of claim 1, further comprising at least one of a deployable sail, a parachute, sea anchor, or a weight that deploys from a tail boom at or about a tail rotor upon water landing to provide a weathercock.

5. The apparatus of claim 1, further comprising a first, a second, or both a first and second deployable boom, each of the first boom, the second boom, or both being attached by a first end to the aircraft; and a first air bladder attached to a second end of the first boom; a second air bladder attached to the second end of the second boom, or both; wherein the first, the second, or both the first and second booms and the first, the second, or both, the first and second deployable air bladders, are deploy upon a water landing.

6. The apparatus of claim 5, further comprising a first weight attached to a second end of the first boom, a second weight attached to a second end of the second boom, or both a first and a second weight attached to the first and second boom, respectively, wherein the first, the second, or both the first and second weights are deployed upon a water landing.

7. An aircraft comprising:
a plurality of float kits comprising air bladders that deploy around the aircraft upon a water landing, wherein the air bladders support the aircraft in the water; and
a deployable keel affixed by a first end to the aircraft and capable of deployment substantially perpendicular to a longitudinal axis and opposite a rotor of the aircraft upon a water landing, wherein the keel is sized to prevent aircraft rollover and wherein the keel is defined further as comprising a support and fabric, wherein the fabric deploys between the support and the aircraft.

8. The aircraft of claim 7, wherein the keel is affixed at either a front of the aircraft and fans out from back to front of the aircraft, or the keel is affixed to a rear of the aircraft and deploys from front to back.

9. The aircraft of claim 7, wherein the keel is defined further as comprising weight at the end opposite the attachment of the keel to the aircraft.

10. The aircraft of claim 7, further comprising at least one of a deployable sail, a parachute, sea anchor, or a weight that deploys from a tail boom at or about a tail rotor upon water landing to provide a weathercock.

11. The aircraft of claim 7, further comprising a first, a second, or both a first and second deployable boom, each of the first boom, the second boom, or both being attached by a first end to the aircraft; and a first air bladder attached to a second end of the first boom; a second air bladder attached to the second end of the second boom, or both; wherein the first, the second, or both the first and second booms and the first, the second, or both, the first and second deployable air bladders, are deploy upon a water landing.

12. The aircraft of claim 11, further comprising a first weight attached to a second end of the first boom, a second weight attached to a second end of the second boom, or both a first and a second weight attached to the first and second boom, respectively, wherein the first, the second, or both the first and second weights are deployed upon a water landing.

13. A method of preventing aircraft rollover upon a water landing of an aircraft that is supported by a plurality of float kits of the aircraft, the method comprising:
selecting a sea state and an aircraft; and
sizing a deployable keel affixed by a first end to the aircraft and capable of deployment substantially perpendicular to a longitudinal axis and opposite a rotor of the aircraft upon a water landing, wherein the keel is sized to prevent aircraft rollover upon deployment, and wherein the keel is defined further as comprising a support and fabric, and deploying the fabric between the support and the aircraft.

14. The method of claim 13, further comprising affixing the keel at either a front of the aircraft that fans out from back to front of the aircraft, or affixing the keel to a rear of the aircraft that deploys from front to back.

15. The method of claim 13, wherein the keel is defined further as comprising weight at the end opposite the attachment of the keel to the aircraft.

16. The method of claim 13, further comprising deploying at least one of a deployable sail, a parachute, sea anchor, or a weight from a tail boom at or about a tail rotor upon water landing to provide a weathercock.

17. The method of claim 13, further comprising sizing a first, a second, or both a first and second deployable boom, each of the first boom, the second boom, or both being attached by a first end to the aircraft; and a first air bladder attached to a second end of the first boom; a second air bladder attached to the second end of the second boom, or both; wherein the first, the second, or both the first and second booms and the first, the second, or both, the first and second deployable air bladders, are deploy upon a water landing.

18. The method of claim 17, further comprising attaching a first weight to a second end of the first boom, attaching a second weight to a second end of the second boom, or attaching both a first and a second weight to the first and second boom, respectively, wherein the first, the second, or both the first and second weights are deployed upon a water landing.

* * * * *